Dec. 10, 1940.     H. F. FRUTH     2,224,150
ELECTROLYTIC CONDENSER
Original Filed Nov. 15, 1934
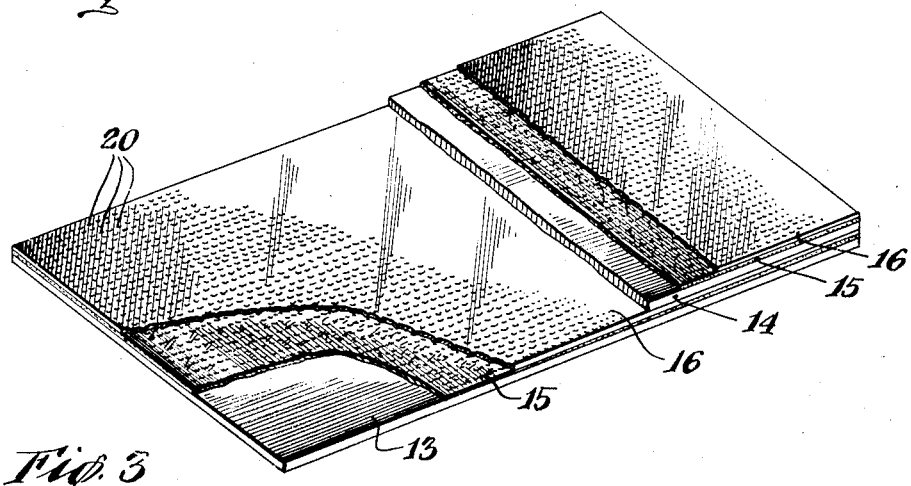
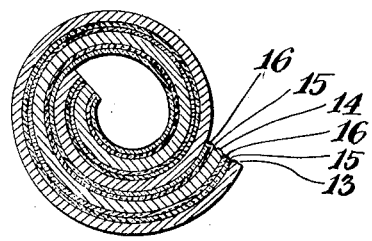
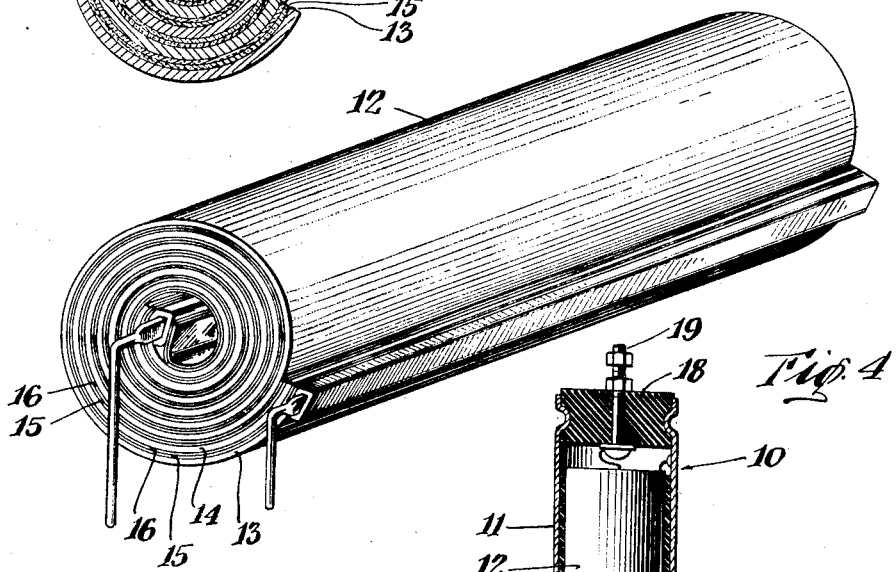
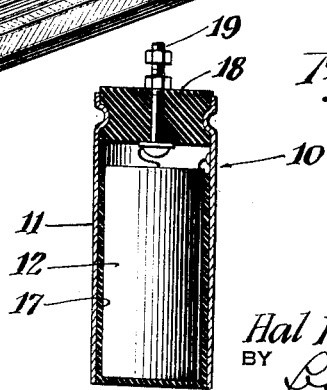
INVENTOR
Hal F. Fruth
BY
ATTORNEY Patented Dec. 10, 1940

2,224,150

UNITED STATES PATENT OFFICE 2,224,150

ELECTROLYTIC CONDENSER

Hal F. Fruth, Indianapolis, Ind., assignor, by mesne assignments, to P. R. Mallory & Co. Inc., Indianapolis, Ind., a corporation of Delaware Application November 15, 1934, Serial No. 753,116
Renewed March 7, 1940

14 Claims. (Cl. 175—315)

This invention relates to electrical condensers and more particularly to so-called "dry" electrolytic type condensers and constitutes a continuation in part of my co-pending application, Serial Number 713,449, filed March 1, 1934; now Patent 1,981,352, issued November 20, 1934.

An object of the invention is to produce an electrolytic condenser of improved operating characteristics and high efficiency.

Another object is to improve the electrode spacing of dry electrolytic condensers and to increase the amount of electrolyte between the electrode plates or foils.

A further object is to improve the electrical characteristics of the spacers used in such condensers.

A still further object is to simplify manufacture of such condensers and to facilitate their assembly.

Other objects will be apparent from the following description together with the accompanying claims.

According to a preferred form of the invention the electrode plates or foils are held in spaced relationship by a laminated spacer including a highly porous lamina of absorbent paper or the like having relatively high electrolyte absorbing capacity and a flexible non-fibrous purified cellulose lamina. The electrolyte, preferably a paste-like composition adapted to maintain a current-blocking film of oxide or other material on one or both of the electrodes, impregnates both the highly porous lamina and the non-fibrous cellulose lamina. An inert filler may, furthermore, be added to the electrolytic paste according to one form of the invention.

In accordance with a modified form of the invention the laminated spacer may be formed of a highly porous lamina and a flexible lamina of relatively non-porous hard surface paper or the like.

In whichever form used the two laminae may be left unattached or they may be secured together, as by adhesive or by embossing into a unitary spacing member of high electrolyte absorbing capacity.

The invention accordingly comprises the features of construction, combination of elements, arrangement of parts, and methods of manufacture referred to above or which will be further brought out and exemplified in the disclosure hereinafter set forth, including the illustrations in the drawing, the scope of the invention being indicated in the appended claims.

For a fuller understanding of the nature and objects of the invention as well as for specific fulfillment thereof, reference should be made to the following detailed description taken in connection with the accompanying drawing, in which:

Figure 1 is a perspective view, with parts broken away, of condenser laminae arranged according to one embodiment of the present invention;

Figure 2 is a perspective view of a condenser section in roll form arranged according to the present invention;

Figure 3 is an enlarged end section, with parts broken away, of the condenser section shown in Figure 2; and Figure 4 shows a completed condenser embodying the present invention.

Like reference characters indicate like parts in the several figures of the drawing.

While a preferred embodiment of the invention will be described herein, it is contemplated that considerable variations may be made in the method of procedure and the construction of parts without departing from the spirit of the present invention.

Referring now to the drawing the condenser 10 (Fig. 4) comprises generally a can or container 11 having contained therein a roll or assembly 12 including metal foils or plates comprising cathode 13 and anode 14 separated by laminated spacers comprising laminae 15 and 16 in each space between the plates or foils. The laminated spacers are preferably saturated with an electrolytic paste or viscous liquid capable of maintaining a current-blocking film on one or both of the electrodes.

The assembly or roll 12 is preferably supported and positioned in the container 11 by a fibre cup member 17 extending the full length of the roll 12. The top of the container may be closed with an insulating cap 18 through which projects a terminal 19 conductively connected in any desired manner with one electrode of the assembly 12 such as the anode 14. The other electrode such as cathode 13 may conveniently be connected to the can or container 11 which forms the other terminal of the condenser.

The above described condenser represents one form of assembly in which the present invention may be embodied but it will be understood that the present invention may be applied equally well to a wide variety of other forms, shapes, and constructions of electrolytic condensers.

The arrangements of electrodes and spacers according to the present invention, is shown more particularly in Figure 1. One or both of the electrodes, comprising metal foils 13 and 14 are preferably of aluminum or other film forming metal, one or both of the foils having a current-blocking film on the surfaces thereof. Included between the electrodes is the laminated spacer comprising lamina 15 formed of a soft absorbent material such as Dexter paper, blotting paper, "super-cellulose" paper or the like. This paper may be calendered, if desired, to form a relatively smooth surface. Superimposed thereon is another lamina 16 of smooth flexible material, preferably a non-fibrous cellulose sheet such as regenerated cellulosic sheet material, "cellophane," or the like or a relatively non-porous hard surface paper.

The two laminae may be left smooth and relatively non-adherent or they may be secured together by glue or other adhesive means to form a unitary spacing member.

According to a preferred form as shown in Figure 1 the two spacer laminae are embossed together mechanically, the emboss 20 preferably being of relatively fine texture so that the sheets have a characteristic "linen finish." The embossed "hills and valleys" will form interlocking portions which hold the two laminae together as a single unit. In some instances, however, the Cellophane only, may be embossed in which case the two laminae will not be interlocked.

Prior to assembly the spacer laminae are accordingly glued or embossed together, if desired, or are merely wound into a roll together. Upon assembly the combined spacer is wound together with the electrode foils. In some instances the laminae 15 and 16 may be wound from separate rolls directly into rolls with the electrodes. The result in all instances will be the roll 12 such as is illustrated in Figures 2 and 3 comprising electrode foils 13 and 14 separated on both sides by laminated spacers comprising laminae 15 and 16.

The electrolyte, preferably in the form of a paste, may be introduced into the spacers during winding or after the winding is completed, as desired. A suitable electrolyte may comprise an ammonium borate, ethylene glycol, boric acid composition or similar electrolyte composition prepared with a polyhydric alcohol falling within the classes of glycols and glycerols and a weak acid such as boric, citric, malic, lactic, tartaric formic and phosphoric and/or their salts as is more fully described in Patent 1,891,207 issued to S. Ruben on Dec. 13, 1932.

Furthermore, according to a preferred form of the present invention, an inert filler such as diatomaceous earth or cellular silica (forms of which are commonly identified by the trade names "celite" and "Sil-o-cel") is added to the electrolytic paste. This filler serves as an absorbing or carrying medium for a large part of the electrolyte. Tests have shown the addition of this material to be advantageous in condensers of the type disclosed herein as well as those using an electrolyte with "cellophane" or absorbent paper alone. The filler not only reduces the cost of the electrolytic paste but also distinctly improves the characteristics thereof by increasing its apparent viscosity and by reducing its slipperiness. Thus the ease of winding the condenser is considerably improved. Furthermore, the particles of cellular silica tend to furnish paths for the escape of gases.

"Cellophane," as commercially produced, is usually found to contain a small amount of chlorine which tends to develop corrosion within the condenser. It is proposed, therefore, according to the present invention, that the "cellophane" be washd in distilled water before using. It may also be found desirable to previously wash the absorbent layer and the hard surface paper, where used, in order to rid them of harmful chemicals.

Where the "cellophane" is washed with distilled water the chlorine content is preferably reduced to one part in 200,000 or .0005%.

The washed "cellophane" may be tested for chlorides by the following method:

2 grams of the "cellophane" is torn into small pieces about 2 inches square and digested in a beaker containing 100 cubic centimeter of 10% C. P. nitric acid. Digestion shall be at the boiling point and the solution shall be vigorously and continuously stirred or agitated for a period of five minutes. The boiling of the solution shall be very slow such that very little water will be evaporated. This nitric acid "cellophane" extract is then filtered through a previously washed filter paper which has been washed with cold 10% nitric acid two or three times. The "cellophane" residue left in the beaker shall be agitated with about 5 c. c. of 10% nitric acid and this portion drained off through the filter. Such successive small portions shall be repeated until the filtrate is 100 c. c. in volume. The filtrate is then placed in a 100 c. c. Nessler tube.

For the comparison standard a known chloride solution is made as follows:

.1649 gram of C. P. sodium chloride is dissolved in one litre of distilled water. This contains .1000 gram of chlorine per litre or one part in 10,000. .10 c. c. of this standard solution is measured out into a 100 c. c. Nessler tube and diluted with 10% nitric acid to make 100 c. c. This contains chlorine to the extent of one part in 10,000,000. Three or four drops of silver nitrate is now added to both Nessler tubes containing the comparison sample and the "cellophane" extract. Both tubes are stoppered with a rubber stopper and the solutions thoroughly mixed and allowed to stand for five minutes after which they shall be examined in diffused daylight and the tube containing the "cellophane" test shall contain no more blue opalescence than the tube containing the comparison standard. This corresponds to the chlorine content in the original sample of "cellophane" of one part in 200,000 or on a percentage basis of .0005%.

Routine testing for chlorides may be conducted according to the following simplified procedure:

85 square inches of the material is torn into small bits and placed in a 250 c. c. beaker and 100 c. c. of 10% nitric acid added. The material is then digested with vigorous continual stirring with a stirring rod for five minutes. The digestion to be carried out to the point of faint boiling. The sample is then filtered through a previously washed filter paper which has been washed with cold 10% nitric acid two or three times and to about 10 c. c. of the filtrate in a test tube three or four drops of silver nitrate is added. Chlorides must be absent to the extent that no more than a blue opalescence appears in the solution.

For a further determination of the electrolytic materials in the "cellophane" the following conductivity test may be performed:

85 square inches of "cellophane" shall be torn into small bits and placed in a 250 c. c. beaker and 100 c. c. of distilled water added. The "cellophane" shall be digested to the point of faint boiling for five minutes with continual and vigorous agitation with a stirring rod. After this the hot distilled water extract shall be placed in an Ostwald conductivity cell and the resistance of the solution measured at a temperature of 75-deg. C. or above. This measurement shall be made with A. C. current having a frequency of 1,000 cycles.

The "cellophane" should preferably be washed free from chlorine, chlorides and other conductive or corrosive impurities to the extent that the resistance of the solution, prepared as outlined above, is not substantially less than 25,000 ohms.

The above tests may be used as described or in slightly modified form for determining the chloride and electrolyte content of the absorbent paper or layer and of the hard surface paper.

Various thicknesses of spacer members may be used. A preferred combination consists of layers of substantially equal thickness and may be comprised, for example, of Dexter paper .001 inch in thickness and plain or embossed Cellophane .00088 inch in thickness.

"Cellophane" has been found to give higher voltage breakdown values in condensers than almost any other spacing material. Likewise it has adequate strength for rolling into the condenser assembly. On the other hand some difficulty is frequently encountered in winding condenser assemblies using only Cellophane spacers due to slippage of the Cellophane.

The absorbent paper entirely prevents slippage during winding giving a compact uniformly wound assembly. The weak paper layer, in turn, is supported by the "Cellophane." Thus each lamina supplements the other to give a spacer member having winding characteristics which neither possesses alone. The absorbent paper likewise will carry more electrolyte into the condenser than will "Cellophane." These advantages, coupled with the high strength and electrical breakdown value of the "Cellophane" contribute to provide a highly improved condenser spacer member. Furthermore, by embossing the Cellophane the electrolyte absorbing and carrying capacity of the spacer is considerably increased.

Since the Dexter paper may be used in sheets much thinner than gauze spacers the space factor of condensers using paper and Cellophane spacers is much better than those using gauze and Cellophane and a better power factor obtains.

Furthermore, the combined thickness of the Dexter paper and "Cellophane" used, is generally not greater than .002 inch compared with the usual single gauze thickness of .008 inch so that an important space saving is made when the spacer of this invention is substituted.

While the present invention, as to its objects and advantages, has been carefully described herein, as carried out in specific embodiments thereof, I do not desire to be limited thereby but intend to cover the invention broadly within the spirit and scope of the appended claims.

What is claimed is:

1. A dry electrolytic condenser comprising two electrode plates, at least one of which is provided with a current-blocking film, a laminated spacer interposed between said electrode plates comprising a lamina of soft, porous absorbent paper and a flexible, relatively non-porous cellulose lamina, and a film-maintaining electrolyte impregnating said laminae.

2. A dry electrolytic condenser comprising two electrode plates, at least one of which is provided with a current-blocking film, a laminated spacer interposed between said electrode plates comprising a lamina of non-reticular porous absorbent material and a flexible non-fibrous cellulose lamina, and a film-maintaining electrolyte impregnating said laminae.

3. A dry electrolytic condenser comprising two electrode plates, at least one of which is provided with a current-blocking film, a laminated spacer interposed between said electrode plates comprising a lamina of soft absorbent paper and a flexible non-fibrous cellulose lamina, and a film-maintaining electrolyte impregnating said laminae.

4. A dry electrolytic condenser comprising two electrode plates, at least one of which is provided with a current-blocking film, a laminated spacer interposed between said electrode plates comprising a Dexter paper lamina and a regenerated cellulose lamina and a film-maintaining electrolyte impregnating said laminae.

5. A dry electrolytic condenser section in roll form comprising two electrode foils, at least one of which is provided with a current-blocking film, a laminated spacer interposed between adjacent electrode foils comprising a soft absorbent paper lamina and a flexible non-fibrous cellulose lamina, and a film-maintaining electrolyte impregnating said laminae.

6. A conductive sheet spacer for dry electrolytic condensers comprising a laminated spacer consisting of a soft absorbent paper lamina and a flexible non-fibrous cellulose lamina, and a conductive film-maintaining electrolyte impregnating said laminae.

7. A dry electrolytic condenser section in roll form comprising two electrode foils, one of which is provided with a current-blocking film, a pair of laminated spacers each of which includes a soft absorbent paper lamina and a flexible non-fibrous cellulose lamina, a film-maintaining electrolyte composition of paste-like consistency impregnating said laminae, one of said laminated spacers being located on each face of said filmed foil with said cellulose lamina in contact with said current-blocking film.

8. A dry electrolytic condenser section in roll form comprising two electrode foils, at least one of which is provided with a current-blocking film, a pair of laminated spacers each of which includes a soft absorbent paper lamina and a flexible non-fibrous regenerated cellulose lamina, a film maintaining electrolyte composition of paste-like consistency containing a polyhydric alcohol falling within the classes glycols and glycerols impregnating said laminae, one of said laminated spacers being located on each face of said filmed foil with said regenerated cellulose lamina in contact with said current-blocking film.

9. A dry electrolytic condenser comprising two electrode plates, at least one of which is provided with a current-blocking film, a laminated spacer interposed between said electrode plates consisting of a soft absorbent paper lamina and a flexible non-fibrous cellulose lamina secured together with adhesive, and a film-maintaining electrolyte impregnating said laminae.

10. A dry electrolytic condenser comprising two electrode plates, at least one of which is provided with a current-blocking film, a laminated spacer interposed between said electrode plates consisting of a soft absorbent paper lamina and a flexible non-fibrous sheet lamina embossed together, and a film-maintaining electrolyte impregnating said laminae.

11. A dry electrolytic condenser comprising two electrode plates, at least one of which is provided with a current-blocking film, a laminated spacer interposed between said electrode plates consisting of a soft absorbent paper lamina and a flexible non-fibrous embossed sheet lamina, and a film-maintaining electrolyte impregnating said laminae.

12. A dry electrolytic condenser comprising two electrode plates, at least one of which is provided with a current-blocking film, a laminated spacer interposed between said electrode plates consisting of a soft absorbent paper lamina and a flexible chloride-free regenerated cellulose lamina, and a film-maintaining electrolyte impregnating said laminae.

13. A dry electrolytic condenser comprising two electrode plates, at least one of which is provided with a current-blocking film, a laminated spacer interposed between said electrode plates consisting of a lamina of soft absorbent paper approximately .001 inch in thickness and a flexible non-fibrous regenerated cellulose lamina approximately .001 inch in thickness, and a film-maintaining electrolyte impregnating said laminae.

14. A dry electrolytic condenser comprising two electrode plates, at least one of which is provided with a current-blocking film, a cellulosic spacer interposed between said electrode plates and a film-maintaining electrolyte impregnating said spacer, said spacer having a chlorine content not substantially greater than .0005 percent.

HAL F. FRUTH.